United States Patent
Heindl

(10) Patent No.: US 9,022,429 B2
(45) Date of Patent: May 5, 2015

(54) PIPE REDUCTION PIECE MADE FROM PLASTIC MATERIAL

(75) Inventor: Andreas Heindl, Schwabach (DE)

(73) Assignee: Rehau AG + Co, Rehau (DE)

( * ) Notice: Subject to any disclaimer, the term of this patent is extended or adjusted under 35 U.S.C. 154(b) by 199 days.

(21) Appl. No.: 13/000,628

(22) PCT Filed: Jun. 22, 2009

(86) PCT No.: PCT/EP2009/004480
§ 371 (c)(1),
(2), (4) Date: Dec. 22, 2010

(87) PCT Pub. No.: WO2009/156107
PCT Pub. Date: Dec. 30, 2009

(65) Prior Publication Data
US 2011/0101677 A1 May 5, 2011

(30) Foreign Application Priority Data

Jun. 24, 2008 (DE) .................... 20 2008 008 371 U

(51) Int. Cl.
*F16L 25/14* (2006.01)
*F16L 47/03* (2006.01)
*F16L 47/26* (2006.01)
*B29C 65/34* (2006.01)
*B29C 65/00* (2006.01)

(52) U.S. Cl.
CPC ................ *F16L 25/14* (2013.01); *F16L 47/03* (2013.01); *F16L 47/265* (2013.01); *B29C 65/3432* (2013.01); *B29C 65/3468* (2013.01); *B29C 66/5221* (2013.01); *B29C 66/52292* (2013.01); *B29C 66/735* (2013.01); *B29C 66/52298* (2013.01)

(58) Field of Classification Search
CPC ....... F16L 47/03; B29C 65/34; B29C 65/342; B29C 66/534
USPC .............. 285/148.18, 148.23, 21.1, 21.2, 22; 138/44, 45
See application file for complete search history.

(56) References Cited

U.S. PATENT DOCUMENTS

| 1,911,856 | A | * | 5/1933 | Stephenson | 285/328 |
| 2,480,791 | A | * | 8/1949 | Valerius | 285/148.23 |
| 7,162,962 | B2 | * | 1/2007 | Fuessel et al. | 111/176 |
| 7,207,601 | B2 | * | 4/2007 | Baharav | 285/21.2 |

FOREIGN PATENT DOCUMENTS

| DE | G 87 01 394 | 7/1988 |
| DE | 197 54 569 A1 | 6/1999 |

(Continued)

OTHER PUBLICATIONS

International Search Report, International patent application No. PCT/EP2009/004480, Oct. 2, 2009.

*Primary Examiner* — James Hewitt
(74) *Attorney, Agent, or Firm* — Da Vinci Partners LLC; John Moetteli

(57) ABSTRACT

A pipe reduction piece (10) made from plastic material, having an interior volume (12) that is provided for being flowed through by a fluid in a predetermined flow direction, wherein the pipe reduction piece (10) is formed from a first section (14) and a second section (16), said sections having interior walls (18, 20) adjoining one another in a flush manner, wherein the interior wall (18) of the first section (14) delimits a first cylindrically configured partial volume (22) of the interior volume (12), and wherein the interior wall (20) of the second section (16) delimits a second partial volume (24) of the interior volume (12), the second partial volume being configured with a decreasing cross-sectional surface in the direction of the first partial volume (22).

15 Claims, 3 Drawing Sheets

(56) References Cited

FOREIGN PATENT DOCUMENTS

| DE | 20 2006 009 436 U1 | 9/2006 |
| DE | 10 2005 052 825 A1 | 5/2007 |
| EP | 0 521 276 | 1/1993 |

* cited by examiner

PIPE REDUCTION PIECE MADE FROM PLASTIC MATERIAL

This application is the National Stage of International Application No. PCT/EP2009/004480, filed Jun. 22, 2009, which claims benefit under 35 USC §119(a), to German patent application Ser. No. 20 2008 008 371.0, filed Jun. 24, 2008.

BACKGROUND OF THE INVENTION

The invention relates to a pipe reducer made from a plastic material.

Known pipe reducers serve to create a fluid-carrying connection between two pipes with different inner diameters; to accomplish this, the known pipe reducers have a design that includes at least three sections, two outer sections with cylindrical, uniform inner diameters, said inner diameters corresponding to the inner diameters of the respective pipes to be connected, and a middle section constituting a transition between the two different inner diameters.

As a result of this design, known pipe reducers require a certain amount of space, particularly when the difference between the inner diameters of the pipes to be connected is quite large, accompanied by the fact that in certain cases in which there is limited space available for a pipeline to be installed, the installation is usually very laborious and difficult.

OBJECT OF THE INVENTION

The object of the invention, therefore, is to disclose a pipe reducer that is smaller and more compact than corresponding known embodiments and particularly with pipe installations in which there is only a small amount of space available for the pipes to be laid, makes it easy to produce a connection between pipes with different inner diameters.

EMBODIMENT OF THE INVENTION

This object is attained according to the invention by means of a pipe reducer made from a plastic material, having an interior volume that accommodates fluid through-flow in a predetermined flow direction, the pipe reducer being composed of a first section and a second section with inner walls adjoining one another in a flush manner, with the inner wall of the first section delimiting a first cylindrically embodied partial volume of the interior volume, and with the inner wall of the second section delimiting a second partial volume of the interior volume, said second partial volume being embodied with a cross-sectional area that decreases in the direction of the first partial volume.

By contrast with known embodiments, the pipe reducer according to the invention is composed of only two sections, with the second section delimiting a second partial volume of the interior volume, said second partial volume being embodied with a cross-sectional area that decreases in the direction of the first partial volume (i.e. toward the first partial volume). The second section constitutes a transition between two different-sized inner diameters or cross-sectional areas so that a third, middle section that is provided in known embodiments is no longer necessary, resulting in a pipe reducer that is significantly smaller than corresponding known pipe reducers, but is nevertheless flow-promoting, with the flow-promoting property particularly having a positive effect on the pressure loss. The reduction in the inner diameter is situated in the second section, which is preferably provided for being connected to the pipe with the larger inner diameter so that the entire length of the second section is available and usable for the reduction in the inner diameter.

The first section has a cylindrically embodied inner volume (or an essentially cylindrically embodied inner volume), i.e. an inner volume with a uniform cross-sectional area (or an essentially uniform cross-sectional area).

The sections have inner walls that adjoin one another in a flush manner so that for example, the inner wall of the first section adjoins the inner wall of the second section in a flush manner or more precisely stated, is connected to the inner wall of the second section in a flush manner, producing a flush transition between the inner wall of the first section and the inner wall of the second section.

The flush adjoining according to the invention advantageously avoids unfavorable flow guidance due to disadvantageous projections or recesses in the transition region.

Preferably, the inner wall of the second section here has a conically extending inner wall in order to produce a flow-optimized flow guidance.

The predetermined flow direction preferably includes an influx via the second section, with the second section being provided for being attached or connected to the pipe that has the larger inner diameter or larger cross-sectional area of the two pipes to be connected.

In a practical embodiment, with regard to an optimum flow guidance that in particular effectively avoids disadvantageous turbulence, the second partial volume is embodied in the form of a truncated cone with a top surface that adjoins the first partial volume.

In a particularly practical embodiment, the first section and second section are embodied as essentially rotationally symmetrical around a central longitudinal axis of the pipe reducer. A pipe reducer embodied in accordance with this embodiment can preferably be produced from a plastic material blank by means of a material-removing production method in the form of the known "turning" method.

In this case, preferably the first section has an outer wall on which a step with a relief groove is provided. The step, which, due to the rotationally symmetrical embodiment, is situated around the central longitudinal axis, can, according to the invention, have a connecting element placed against it, which is provided to produce a connection between the first section and one of the pipes to be connected by means of the pipe reducer, the first section being preferably provided for attaching or connecting to the pipe that has the smaller inner diameter or smaller cross-sectional area of the two pipes to be connected.

The relief groove provided according to the invention is provided for effectively reducing stress concentrations that can arise due to the notching effect, particularly in the event of tensile stress. The step can be spaced apart from an end surface of the first section by a distance that lies in a range from 50 mm to 70 mm.

In another practical embodiment, an end region of the first section has an outer diameter that is smaller than the outer diameter of the second section; the size of the outer diameter of the end region lies within a range from 70 mm to 80 mm and the size of the outer diameter of the second section lies within a range from 85 mm to 165 mm. According to the invention, the end region in this case is provided for connecting to the pipe that has the smaller inner diameter or smaller cross-sectional area of the two pipes to be connected by means of the pipe reducer.

Preferably, the first partial volume has a circular cross-sectional area with a diameter of 60 mm to 65 mm. The second partial volume can have a smaller circular cross-sectional area with a diameter of 60 mm to 65 mm and a largest circular cross-sectional area with a diameter of 70 mm to 140 mm.

According to the invention, the pipe reducer can have an overall length that lies within a range from 120 mm to 180 mm, the first section having a length that lies within a range from 50 mm to 80 mm.

According to the invention, an arrangement of at least two pipes can be produced, whose end sections are connected by means of a pipe reducer (10) according to the present invention.

BRIEF DESCRIPTION OF THE DRAWINGS

Exemplary embodiments of the invention will be described in greater detail below in conjunction with the accompanying drawings.

FIG. 1 is a schematic sectional depiction of an exemplary embodiment of a pipe reducer 10 according to the invention made of a plastic material. The pipe reducer 10 has an interior volume 12 that accommodates fluid through-flow. The pipe reducer 10 is composed of a first section 14 and a second section 16 with inner walls 18, 20 that adjoin one another in a flush manner in order to produce a flow-promoting guidance for the flow. The inner wall 18 of the first section 14 delimits a first cylindrically embodied partial volume 22 of the interior volume 12, and the inner wall 20 of the second section 16 delimits a second partial volume 24 of the interior volume 12, said second partial volume being embodied with a cross-sectional area that decreases in the direction of the first partial volume 22 and is embodied in the form of a truncated cone that has a top surface that adjoins the first partial volume 22, yielding an advantageous flow guidance, in this case with the second partial volume 24 having a smaller cross-sectional area 26 that corresponds or essentially corresponds to the cross-sectional area of the first cylindrical partial volume 22.

The pipe reducer 10 accommodates fluid through-flow in a predetermined flow direction, with the fluid flowing in via the second section 16. The first section 14 has an end region 29 that is provided for being connected to the pipe that has the smaller inner diameter or smaller cross-sectional area of the two pipes to be connected by means of the pipe reducer. The second section 16 is provided for being connected to the other pipe that has the larger inner diameter or larger cross-sectional area of the two pipes to be connected.

Figure 1:
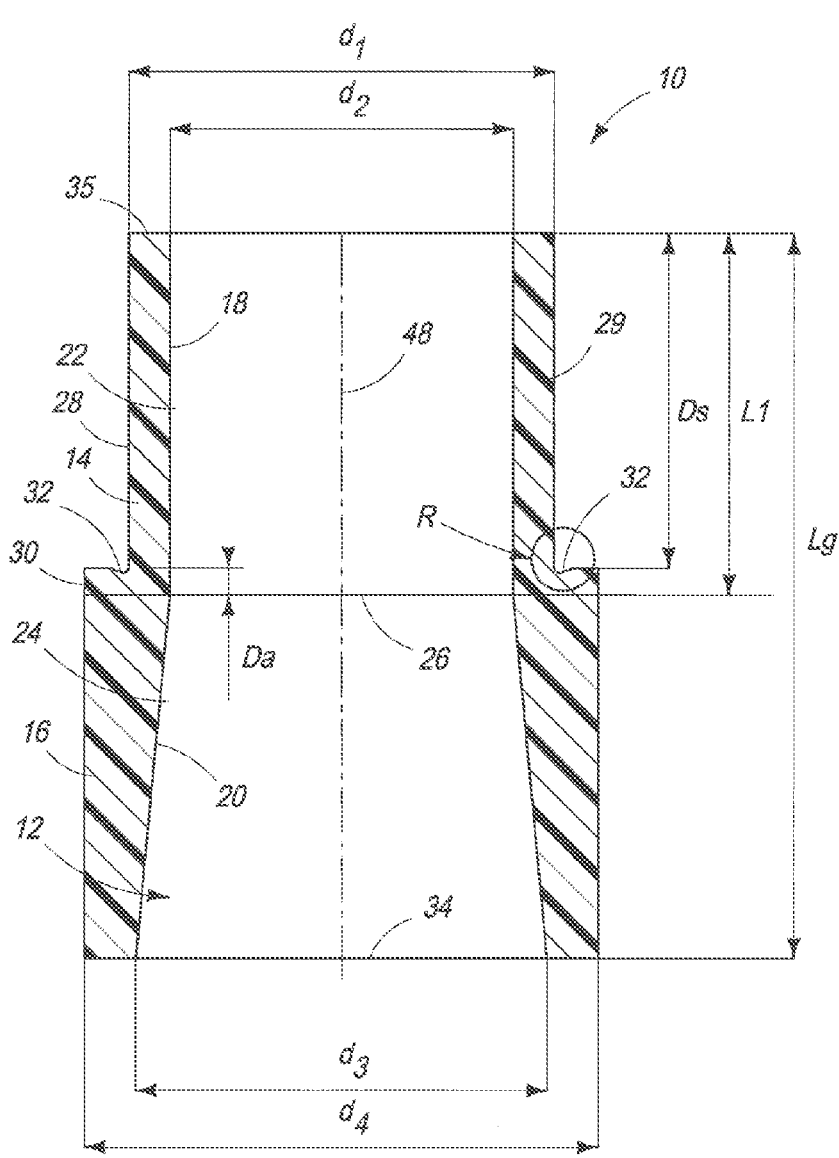
FIG. 1 is a schematic sectional depiction of an exemplary embodiment of a pipe reducer according to the invention.
Figure 1:
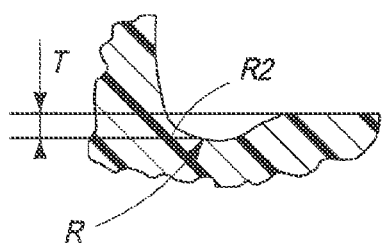

The pipe reducer 10 is a pipe reducer 10, which is produced by means of a known material-removing turning operation and is rotationally symmetrical around a central longitudinal axis 48; the first section 14 has an outer wall 28 on which a step 30 with a relief groove 32 is provided; the relief groove 32 has a radius R of 2 mm, but this radius can also lie within a range, for example, from 1 mm to 4 mm, and furthermore has a corresponding depth T of approx. 1 mm (an enlargement of the relief groove contour is depicted at the bottom of FIG. 1).

The step 30 has a distance Ds of approx. 61 mm (preferably with a tolerance of plus 1 mm) from an end surface 35 of the first section 14 and also has a shortest distance Da of approx. 5 mm (preferably with a tolerance of plus 1 mm) from the second section. The transition between the first partial volume 22 and the second partial volume 24 includes a radius of 5 mm.

The end region 29 of the first section 14 has an outer diameter $d_1$ of approx. 75 mm (preferably with a tolerance of minus 0.2 mm) and according to the invention, can also have values within a range, for example, from 70 mm to 80 mm. The first section 14 has an inner diameter of $d_2$. The outer diameter $d_4$ of the second section 16 is approx. 90 mm (preferably with a tolerance of minus 0.2 mm) and according to the invention, can also have values within a range, for example, from 85 mm to 165 mm. The second section 16 has an internal diameter $d_3$.

The first cylindrical partial volume 22 has a circular cross-sectional area with a diameter d of 61.4 mm (preferably with a tolerance of minus 0.3 mm) and according to the invention, the diameter can also have values within a range, for example, from 60 mm to 65 mm. The second partial volume 24 can have a largest circular cross-sectional area 34 with a diameter d of 73.6 mm (preferably with a tolerance of minus 0.3 mm) and according to the invention, the diameter can also have values within a range, for example, from 70 mm to 140 mm.

The pipe reducer 10 also has an overall length Lg of approx. 132 mm (preferably with a tolerance of plus 2 mm) and according to the invention, the overall length Lg can also lie in a range, for example, from 120 mm to 180 mm. The first section 14 has a length L1 of approx. 70 mm (preferably with a tolerance of plus 1 mm) and according to the invention, can also lie within a range, for example, from 50 mm to 80 mm.

Figure 2:
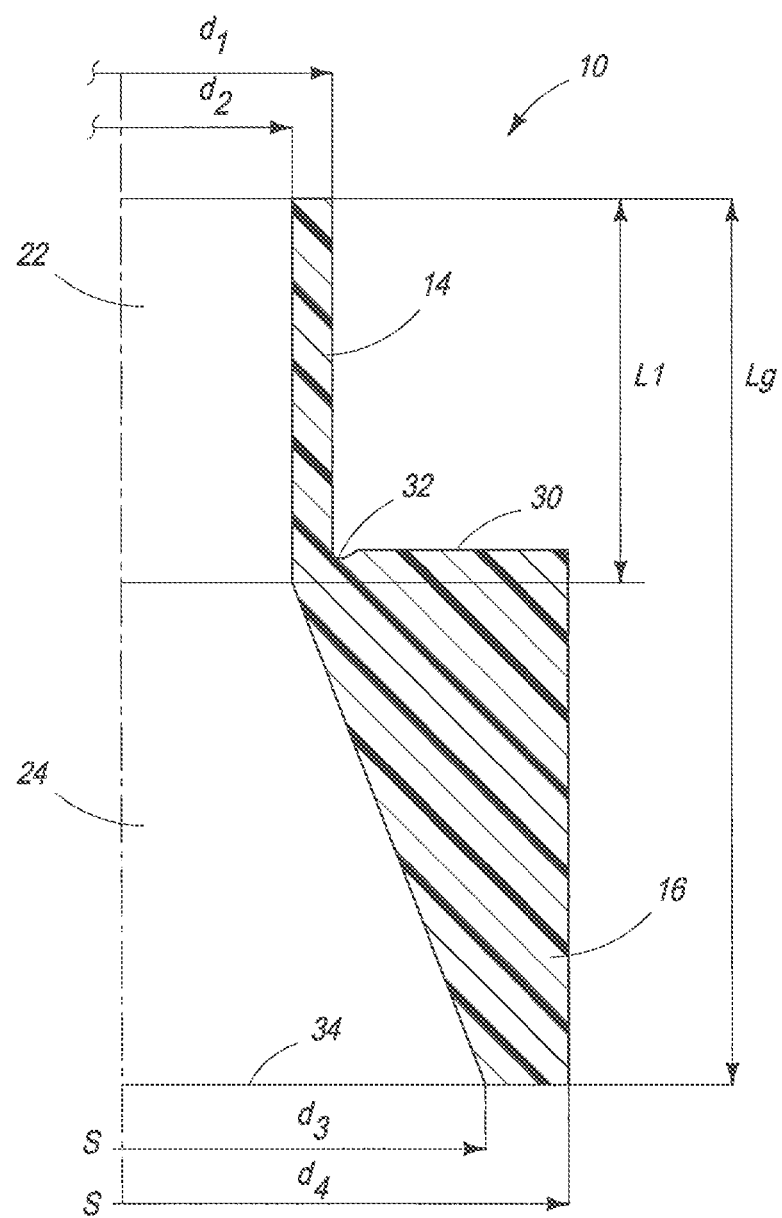
FIG. 2 is a schematic sectional depiction of another exemplary embodiment of a pipe reducer according to the invention.

FIG. 2 is a schematic sectional depiction of another exemplary embodiment of a pipe reducer 10 according to the invention in which by comparison to the pipe reducer 10 shown in FIG. 1, the second section 16 has a significantly larger outer diameter d of approx. 160 mm. In addition, the second partial volume 24 has a largest circular cross-sectional area 34 with a diameter of 130.8 mm. The overall length Lg is also embodied as enlarged here.

It is approx. 165 mm and the first section has a length L1 of approx. 70.5 mm. The relief groove 32 here has a radius of 3 mm.

Figure 3:
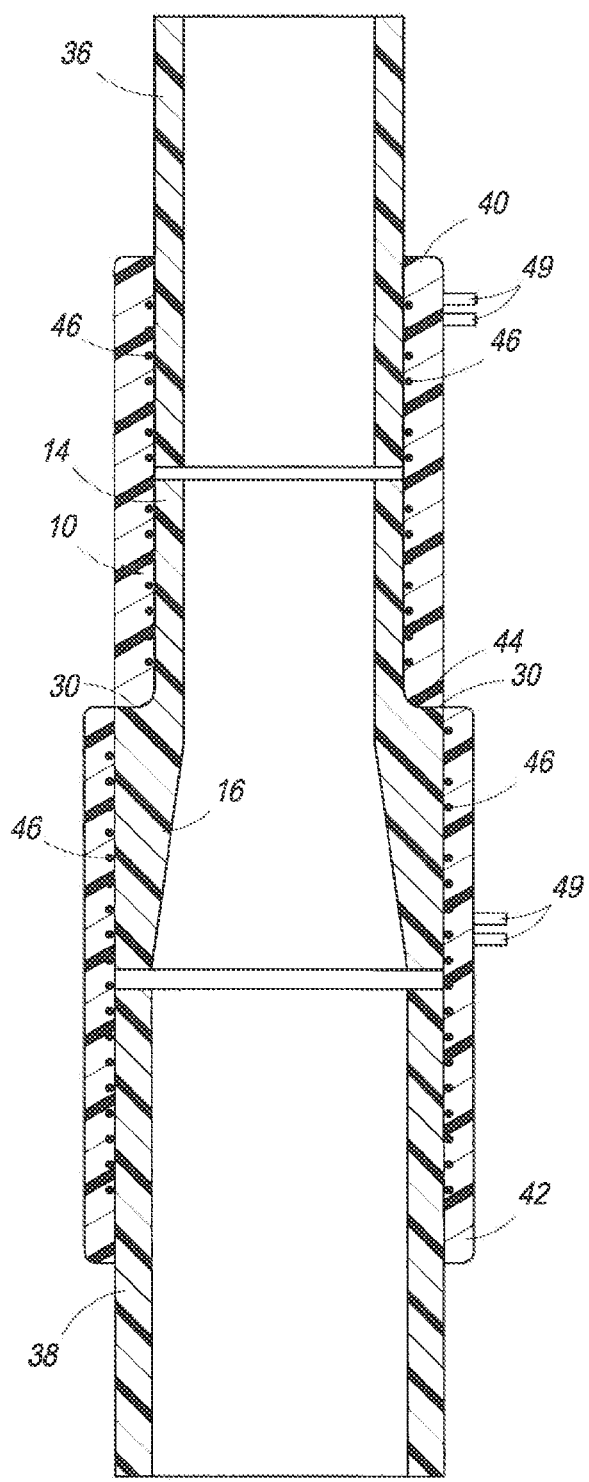
FIG. 3 is a schematic sectional depiction of an arrangement including a pipe reducer according to the invention, two end sections of two pipes to be connected, and two connecting elements.

FIG. 3 shows a schematic sectional depiction of an arrangement including a pipe reducer 10 according to the invention, two end sections 36, 38 of two pipes to be connected, and two connecting elements 40, 42.

FIG. 3 shows the situation before the first section 14 and second section 16 of the pipe reducer 10 are connected to the end sections 36, 38 of two pipes made of plastic material via a first and second connecting element 40, 42 made of plastic material in which the end sections 36, 38 are partially accommodated. The first connecting element 40 rests with an end surface 44 against the shoulder 30 of the first section 14 of the pipe reducer 10 according to the invention. In order to produce an integrally joined connection between the first section 14 of the pipe reducer 10 and the end section 36 or more precisely stated, between the second section 16 of the pipe reducer 10 and the end section 38, each connecting element 40, 42 has a powered heating device 46 in the form of a heating wire 46 that makes it possible to melt the plastic material of the connecting elements 40, 42 in the vicinity of the heating wires 46 by means of warming or heating in order to produce an integrally joined, fluid-tight connection between the end sections 36, 38 and the pipe reducer 10. The ends of each heating wire 46 are each accommodated in a respective connecting element 49 (schematically depicted) of the connecting elements 40, 42; the connecting elements 49 are designed to be connected to a conventional power source that is provided to supply power to the heating wire 46.

REFERENCE NUMERAL LIST

10 pipe reducer
12 inner volume
14 first section
16 second section
18 inner wall of first section
20 inner wall of second section
22 first partial volume
24 second partial volume
26 cross-sectional area of second partial volume
28 outer wall of first section
29 end region
30 shoulder
32 relief groove
34 cross-sectional area of second partial volume
35 end surface of first section
36, 38 end section of pipe
40, 42 connecting element
44 end surface of connecting element
46 heating wire
48 central longitudinal axis
49 connecting element

The invention claimed is:

1. A pipe assembly comprising:
at least two pipes each having an end section, a first pipe having a greater inner diameter than a second pipe;
a plastic pipe reducer having an interior volume that accommodates fluid flow, the reducer having a first section and a second section with inner walls adjoining one another in a transitional region in a flush manner, with the inner wall of the first section delimiting a first cylindrically embodied partial volume of the interior volume, and with the inner wall of the second section delimiting a second partial volume of the interior volume, said second partial volume having a cross-section that decreases in the direction of the first partial volume, wherein the first section and the second section of the pipe reducer are essentially rotationally symmetric around the longitudinal axis of the reducer, wherein the first section of the reducer has an outer wall that defines a step, wherein a relief groove is formed in the step; and
first and second connecting elements, the first connecting element having one end connected to the end section of the first pipe and the other end connected to the reducer, the second connecting element having one end connected to the end section of the second pipe and the other end connected to the reducer so as to abut the step, the connecting elements connecting the first and second pipes to the reducer, wherein the first connecting element includes heating wires therein and is integrally joined to the end section of the first pipe and to the reducer by electrofusion, and wherein the second connecting element includes heating wires therein and is integrally joined to the end section of the second and to the reducer by electrofusion.

2. The pipe assembly as recited in claim 1, wherein the second partial volume of the pipe reducer is embodied in the form of a truncated cone with a top surface that adjoins the first partial volume.

3. The pipe assembly as recited in claim 2, wherein the first partial volume of the pipe reducer has a circular cross-sectional area with a diameter from 60 mm to 65 mm.

4. The pipe assembly as recited in claim 2, wherein the second partial volume of the pipe reducer has a smallest circular cross-sectional area with a diameter from 60 mm to 65 mm and a largest circular cross-sectional area with a diameter from 70 mm to 140 mm.

5. The pipe assembly as recited in claim 1, wherein the step of the pipe reducer is spaced apart from an end surface of the first section of the pipe reducer by a distance that lies in a range from 50 mm to 70 mm.

6. The pipe assembly as recited in claim 5, wherein an end region of the first section of the pipe reducer has an outer diameter that is smaller than the outer diameter of the second section; the size of the outer diameter of the end region lies within a range from 70 mm to 80 mm and the size of the outer diameter of the second section lies within a range from 85 mm to 165 mm.

7. The pipe assembly as recited in claim 5, wherein the first partial volume of the pipe reducer has a circular cross-sectional area with a diameter from 60 mm to 65 mm.

8. The pipe assembly as recited in claim 1, wherein an end region of the first section of the pipe reducer has an outer diameter that is smaller than the outer diameter of the second section; the size of the outer diameter of the end region lying within a range from 70 mm to 80 mm and the size of the outer diameter of the second section lying within a range from 85 mm to 165 mm.

9. The pipe assembly as recited in claim 8, wherein the first partial volume of the pipe reducer has a circular cross-sectional area with a diameter from 60 mm to 65 mm.

10. The pipe assembly as recited in claim 1, wherein the first partial volume of the pipe reducer has a circular cross-sectional area with a diameter from 60 mm to 65 mm.

11. The pipe assembly as recited in claim 1, wherein the second partial volume of the pipe reducer has a smallest circular cross-sectional area with a diameter from 60 mm to 65 mm and a largest circular cross-sectional area with a diameter from 70 mm to 140 mm.

12. The pipe assembly as recited in claim 1, wherein the pipe reducer has an overall length that lies in a range from 120 mm to 180 mm and the first section has a length that lies in a range from 50 mm to 80 mm.

13. The pipe assembly as recited in claim 1, wherein an end region of the first section of the pipe reducer has an outer diameter that is smaller than the outer diameter of the second section; the size of the outer diameter of the end region lies within a range from 70 mm to 80 mm and the size of the outer diameter of the second section lies within a range from 85 mm to 165 mm.

14. The pipe assembly as recited in claim 1, wherein the first partial volume of the pipe reducer has a circular cross-sectional area with a diameter from 60 mm to 65 mm.

15. An installation of a fluid flow line in which fluid flow proceeds in one direction, the installation comprising the pipe assembly of claim 1, wherein the pipes and pipe reducer are oriented so that fluid flow in the pipes proceeds from the second pipe to the first pipe.

* * * * *